United States Patent
Edeson et al.

(10) Patent No.: US 8,455,804 B2
(45) Date of Patent: Jun. 4, 2013

(54) APPARATUS FOR ADJUSTING OPTICAL MIRRORS

(75) Inventors: Ruben Laurence Edeson, Marcham (GB); Nicholas Richard Waltham, Newbury (GB); Nigel Morris, Abingdon (GB); Ian Allan James Tosh, Didcot (GB)

(73) Assignee: The Science and Technology Facilities Council, Warrington (GB)

( * ) Notice: Subject to any disclaimer, the term of this patent is extended or adjusted under 35 U.S.C. 154(b) by 415 days.

(21) Appl. No.: 12/672,538

(22) PCT Filed: Aug. 8, 2008

(86) PCT No.: PCT/GB2008/002721
§ 371 (c)(1),
(2), (4) Date: Feb. 8, 2010

(87) PCT Pub. No.: WO2009/019492
PCT Pub. Date: Feb. 12, 2009

(65) Prior Publication Data
US 2010/0213349 A1 Aug. 26, 2010

(30) Foreign Application Priority Data
Aug. 9, 2007 (GB) .................................. 0715438.8

(51) Int. Cl.
*G01J 1/20* (2006.01)
(52) U.S. Cl.
USPC ..................... 250/201.1; 250/201.2; 250/216; 356/399; 356/400
(58) Field of Classification Search
USPC ................ 250/201.1, 201.2, 216, 206, 214.1, 250/214 R; 356/127, 399, 400, 153
See application file for complete search history.

(56) References Cited

U.S. PATENT DOCUMENTS

| 3,453,633 | A | 7/1969 | Phillips |
| 4,776,684 | A | 10/1988 | Schmidt-Kaler |

(Continued)

FOREIGN PATENT DOCUMENTS

| SU | 1027668 A | 7/1983 |
| WO | 0165297 A2 | 9/2001 |

OTHER PUBLICATIONS

PCT/GB2008/002721 International Search Report, Nov. 21, 2008.
English Translation of Soviet Union Published Description of Invention No. SU 1027668 A of Vasilyev, A.S. et al.; published Jul. 7, 1983.

(Continued)

*Primary Examiner* — Francis M Legasse, Jr.
(74) *Attorney, Agent, or Firm* — Mark E. Scott; Conley Rose, P.C.

(57) ABSTRACT

An optical apparatus comprising a first mirror (12), a second mirror (14), and at least one support (30) for holding the second mirror in substantially a predetermined position relative to said first mirror (12), wherein said at least one support (30) comprises at least one actuator (32) arranged to adjust the position of the second mirror (14), and said optical apparatus further comprises at least one light source (40a-40-c) rigidly fixed to the first mirror (12) in a predetermined orientation for providing a beam of light (42a-42c) directed at said second mirror (14), at least one corresponding alignment sensor (46a-46c) for detecting the beam of light (44a-44c) reflected from said second mirror (14), and arranged to provide an output signal indicative of the position of the incident reflected beam, and a controller (50) arranged to receive said output signal, and to thereby control said actuator (32) to adjust the position of the second mirror (14).

20 Claims, 3 Drawing Sheets

U.S. PATENT DOCUMENTS

| | | | | |
|---|---|---|---|---|
| 4,925,301 A | * | 5/1990 | Rafanelli | 356/124 |
| 5,282,016 A | * | 1/1994 | Shen et al. | 356/400 |
| 5,734,516 A | | 3/1998 | Sayede | |
| 2003/0227635 A1 | | 12/2003 | Muller | |
| 2006/0018012 A1 | | 1/2006 | Smith et al. | |

OTHER PUBLICATIONS

Search Report issued Dec. 3, 2007 in UK Patent Application GB0715438.8.

* cited by examiner

APPARATUS FOR ADJUSTING OPTICAL MIRRORS

CROSS-REFERENCE TO RELATED APPLICATIONS

This application is a 35 U.S.C. §371 national stage application of PCT Application No. PCT/GB2008/002721, filed 8 Aug. 2008, and entitled Optical Mirror System, hereby incorporated herein by reference, which claims priority to UK Patent Application No. 0715438.8, filed 9 Aug. 2007, hereby incorporated herein by reference.

STATEMENT REGARDING FEDERALLY-SPONSORED RESEARCH OR DEVELOPMENT

Not applicable.

BACKGROUND

The present invention relates to optical apparatus including mirrors, and to associated methods of manufacture and operation of such apparatus. Embodiments of the present invention are particularly suitable for, but not limited to, application in optical telescopes, particularly those telescopes launched into space.

Optical telescopes can increase the apparent angular size of distant objects, as well as the apparent brightness of such objects. Telescopes utilise one or more curved optical elements (e.g. lenses or mirrors) to gather light or other electromagnetic radiation, and bring that light/radiation to a focus, where the image can be observed, photographed or otherwise captured e.g. by a two-dimensional image sensor. Optical telescopes can be used for astronomy, and can also be used in many non-astronomical instruments including theodolites, transits, spotting scopes, monoculars, binoculars, camera lenses and spyglasses.

In order for the telescope to provide optimal performance, it is critical that the optical elements are correctly positioned, to at least within predetermined tolerances. Many telescopes will experience forces during transportation or operation, such as vibrations, accelerations, or impacts due to being dropped, which could potentially result in the misalignment of the optical elements. Perhaps the most extreme example of such a force is the acceleration experienced by telescopes for use in space, as they are launched from the earth by rocket.

Other factors, including environmental factors, will affect the mechanical stability of optical apparatus such as telescopes, and hence affect the relative alignment of the optical elements within the apparatus. For example, material properties will undergo changes depending upon the environment in which they are located e.g. in a vacuum environment outgassing can occur, whilst in other environments materials may absorb gases from the environment. The materials within the optical apparatus can also be affected by environmental temperatures. Material properties may also alter over time due to temperature effects, e.g. due to the materials experiencing relatively high or low temperatures, or cycles of temperatures. Materials will often expand or contract as a function of temperature, potentially resulting in changes in the relative positions of optical elements within the optical apparatus. Equally, different portions of the apparatus may experience different temperatures (i.e. a temperature gradient may be set up across the apparatus) that could also result in relative movement (and hence misalignment) of the optical elements.

It is particularly critical in space telescopes that the optimum alignment of the optical elements is maintained, due to the difficulties and prohibitive cost associated with manually re-aligning the optical elements once the telescope is in space.

In order to prevent misalignment of the optical elements within such telescopes, extremely rigid supports, such as struts, are used to fix the optical elements into position. Disadvantageously, providing such rigid support structures results in an increase in weight of the telescope. This is particularly disadvantageous for space telescopes, due to the prohibitive cost associated with launching heavy objects into space.

It is an aim of embodiments of the present invention to address one or more problems of the prior art, whether referred to herein or otherwise. It is an aim of particular embodiments of the present invention to provide an approved optical mirror system which may be used in space telescopes.

SUMMARY

In a first aspect, the present invention provides an optical apparatus comprising: a first mirror; a second mirror; and at least one support for holding the second mirror in substantially a predetermined position relative to said first mirror, wherein said at least one support comprises at least one actuator arranged to adjust the position of the second mirror; and said optical apparatus further comprises: at least one light source rigidly fixed to the first mirror in a predetermined orientation for providing a beam of light directed at said second mirror; at least one corresponding alignment sensor for detecting the beam of light reflected from said second mirror, and arranged to provide an output signal indicative of the position of the incident reflected beam; and a controller arranged to receive said output signal, and to thereby control said actuator to adjust the position of the second mirror.

Such an optical apparatus allows the relative position of the second mirror to be automatically adjusted. The position of the reflected light beam on the sensor is indicative of the position and orientation of the second mirror. Thus, using the output signal of the sensor(s), the controller can control the actuator(s) to optimise the position of the second mirror. Hence, a lighter (i.e. less rigid) support structure can be utilised to hold the two mirrors in place, with misalignment of the two mirrors (e.g. due to a telescope comprising the two mirrors being launched into space, or the apparatus experiencing vibration or other accelerative forces) being compensated for using the actuator(s). The apparatus could be arranged to adjust the position of the second mirror at one or more predetermined times, or periodically at predetermined intervals, or continuously. For example, in a space telescope, the adjustment could be a one-off re-alignment after launch, a periodic re-alignment on-orbit, or a continuous adjustment during operations.

The apparatus may be arranged such that, when the first and second mirrors are aligned, the beam of light is reflected from the second mirror directly onto the corresponding alignment sensor. Each of said at least one alignment sensor may be fixed to the first mirror.

Each of said at least one alignment sensor may be fixed in a respective predetermined orientation in said apparatus.

The apparatus may comprise a plurality of said light sources and a corresponding plurality of alignment sensors, each positioned adjacent to the first mirror.

The beams of light provided by the light sources may converge towards one another as they travel towards the second mirror. The reflected beams of light may diverge away from one another as they travel towards the respective alignment sensors.

Each light source may be positioned diametrically opposite a corresponding alignment sensor. Said light sources and said sensors may be uniformly spaced around the perimeter of the first mirror.

The apparatus may comprise three of said light sources.

Each of said at least one support may extend between the first mirror and the second mirror, and may be coupled to both the first mirror and the second mirror.

The apparatus may comprise at least three of said supports.

Said controller may be arranged to control said at least one actuator so as to control both the translation and tilt of the second mirror relative to the first mirror.

Said alignment sensor may comprise an array of sensor elements.

Said optical apparatus may comprise a telescope. The first mirror may be a primary mirror of the telescope, and the second mirror may be a secondary mirror of the telescope. Alternatively, the first mirror may be a secondary mirror of the telescope, and the second mirror may be a primary mirror of the telescope.

In a second aspect, the present invention provides a method of manufacturing an optical apparatus, the method comprising: providing a first mirror; providing a second mirror; and providing at least one support for holding the second mirror in substantially a predetermined position relative to said first mirror, wherein said at least one support comprises at least one actuator for adjusting the position of the second mirror; and the method further comprises the steps of: providing at least one light source for providing a beam of light directed at said second mirror; and providing at least one alignment sensor for detecting the beam of light reflected from said second mirror, the sensor being arranged to provide an output signal indicative of the position of the incident reflected beam; and providing a controller arranged to receive said output signal, and to thereby control said actuator to adjust the position of the second mirror.

In a third aspect, the present invention provides a method of operating an optical apparatus, the apparatus comprising a first mirror, a second mirror and at least one support for holding the second mirror in a predetermined position relative to the first mirror, said support comprising at least one actuator for adjusting the position of the second mirror, the method comprising: providing a beam of light directed at the second mirror; detecting the position on a detector of the beam of light reflected from the second mirror; and controlling said actuator to control the position of the second mirror based upon information indicative of the position of the detected beam.

The method may further comprise the step of launching the optical apparatus into space.

Said at least one actuator may be controlled to align the position of the second mirror relative to the first mirror.

BRIEF DESCRIPTION OF THE DRAWINGS

Preferred embodiments of the present invention will now be described, by way of example only, with reference to the accompanying drawings, in which.

DETAILED DESCRIPTION OF PREFERRED EMBODIMENTS

Figure 1:
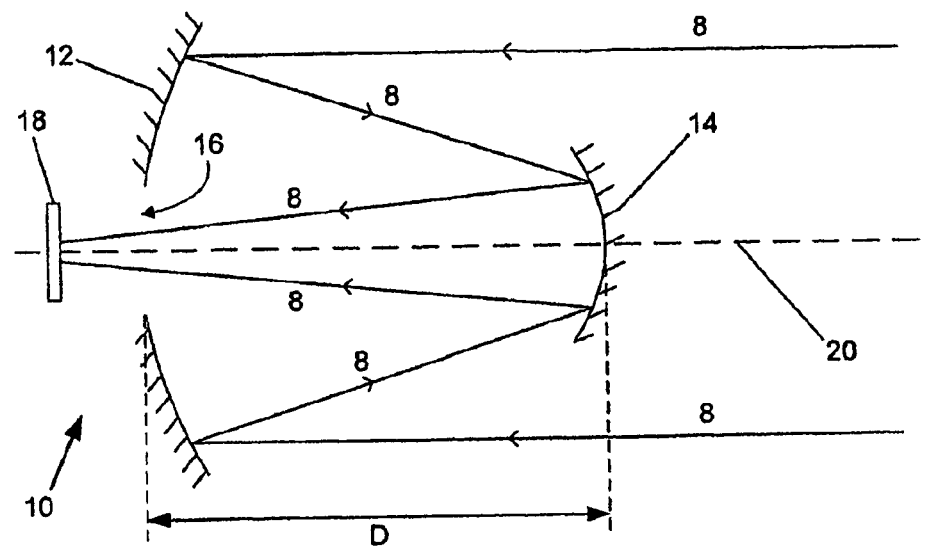
FIG. 1 is a schematic diagram of a telescope in accordance with a preferred embodiment of the present invention.

FIG. 1 shows an optical apparatus in the form of a telescope 10 in accordance with an embodiment of the present invention. The telescope 10 includes two curved mirrors 12 & 14. The curved mirrors 12 & 14 are arranged so as to bring incident light 8 to a focus on an image sensor 18. Typically, the sensor 18 will be a two-dimensional image sensor. The reflective surface of the secondary mirror 14 faces towards the reflective surface of the primary mirror 12. Incident light received by the telescope 10 is first reflected from the surface of the primary mirror 12, towards the reflective surface of the secondary mirror 14, which in turn reflects the light on to the image sensor 18, through a hole 16 in the primary mirror 12. The mirrors 12, 14 and the image sensor 18 are all located along a common optical axis 20. The two mirrors are separated by a distance D along the optical axis. The centre of the hole 16 within the primary mirror 12 is aligned with the optical axis 20.

In a particular example, the distance D is approximately 1 m. The distance D may be 0.5 m or more. The distance D may be 4 m or less. The primary mirror is larger than the secondary mirror. Typically, the primary mirror is generally spherical in shape, and has a diameter of approximately 0.5 m. The diameter of the primary mirror may be 0.1 m or more. The diameter of the primary mirror may be 5 m or less. The secondary mirror 14 will typically be about 0.3 m in diameter. The diameter of the secondary mirror 14 may be 0.05 m or more. The diameter of the secondary mirror 14 may be 3 m or less.

To ensure optimal alignment (within at least predetermined error ranges) of the relative positions of the two mirrors 12, 14, the apparatus 10 further comprises components to allow the detection of the relative position of the secondary mirror 14 to the primary mirror 12 (the position including both the distance between the mirrors and the angle of tilt of the secondary mirror 14 about each of any pair of orthogonal axes perpendicular to the optical axis relative to the primary mirror 12). This system of components will now be described in more detail, with reference to FIGS. 2A-4B.

Figure 2A:
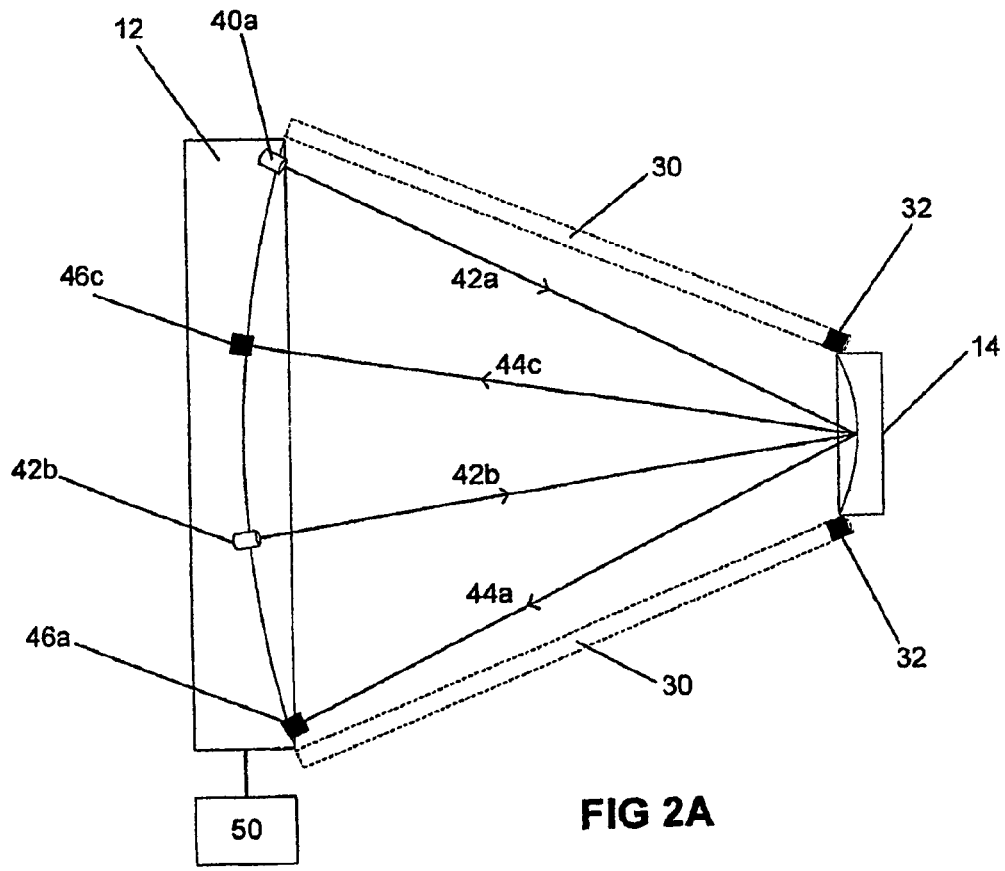
FIGS. 2A & 2B are respectively side and perspective views of the optical mirror system illustrated in FIG. 1.
Figure 2B:
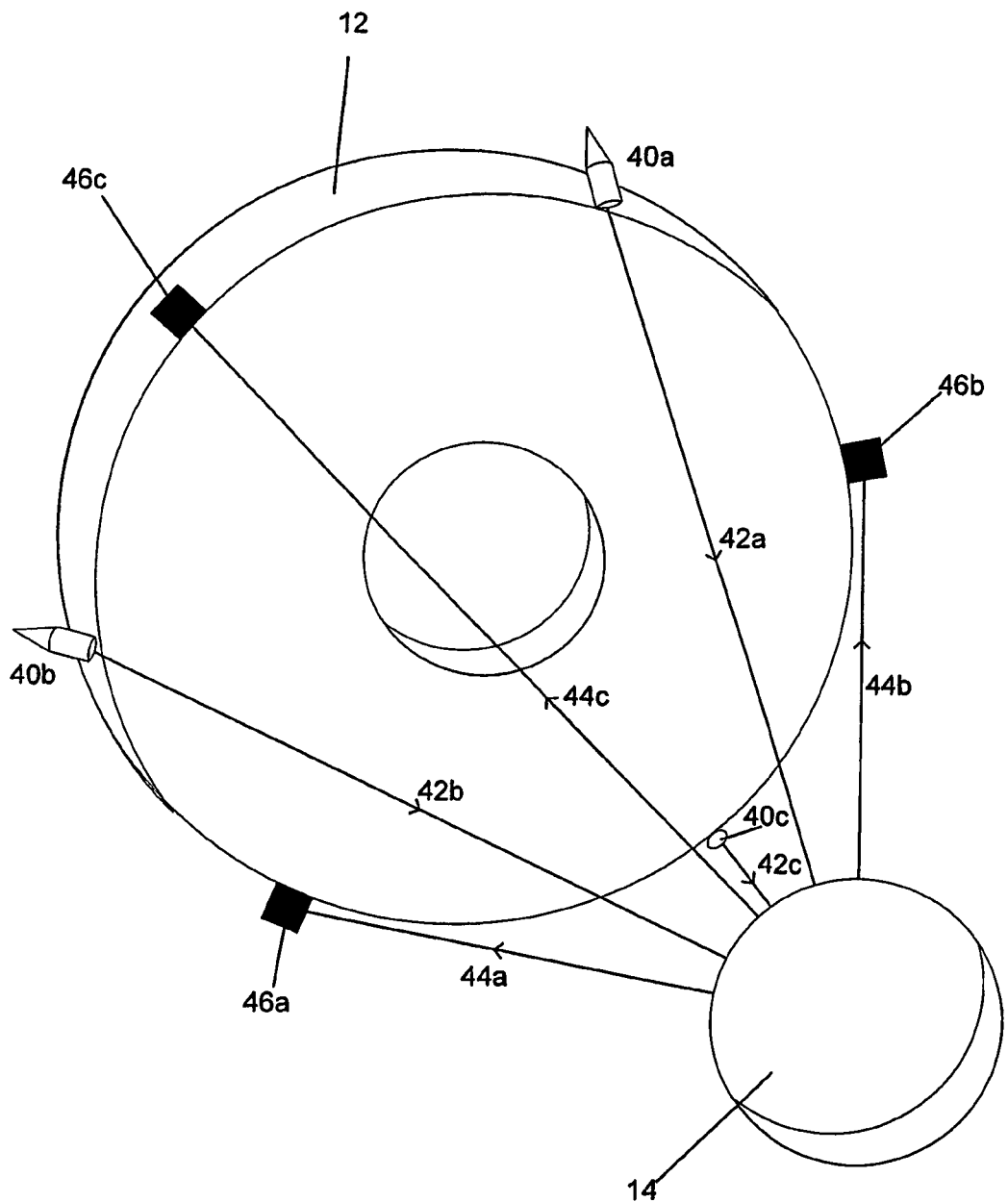

Supports 30 extend from the primary mirror 12 to the secondary mirror 14, and are used to hold the secondary mirror in substantially a predetermined position relative to the primary mirror 12. Each support 30 comprises at least one actuator 32. In FIG. 2A, the actuators 32 are shown as being coupled directly to the secondary mirror 14 (or at least the mounting in which the secondary mirror 14 is located). The other end of each support 30 is coupled to the primary mirror 12 (or at least the mounting in which the mirror is located). The actuators can be controlled, so as to adjust both the distance of the secondary mirror 14 from the primary mirror 12 and the tilt of the secondary mirror 14 relative to the primary mirror 12.

Each actuator 32 can take any known form of actuator. Each actuator may be arranged to separately move and separately tilt the secondary mirror 14.

However, in the simplest embodiment, each actuator takes the form of a screw-thread arrangement driven by an electric motor. Depending on the direction in which the screw-thread is driven, the support 30 can be increased or decreased in length. By providing at least three separate supports 30, each located at a different position around the circumferences of the mirrors 12, 14, altering the lengths of the supports 30 allows both the angle of tilt of the secondary mirror 14 relative to the primary mirror 12, and the separation of the two mirrors 12, 14, to be adjusted. Preferably, the supports are equally spaced around the circumferences/parameters of the mirrors 12, 14. Each actuator is selected to have a range of travel (movement) of at least the maximum travel range required to compensate for any likely relative displacement of the mirrors.

The apparatus 10 includes a controller 50. The controller 50 is arranged to control the actuators, so as to move the secondary mirror 14 (and/or maintain the secondary mirror 14) in the desired predetermined position relative to the primary mirror 12. The controller derives information regarding the relative position of the secondary mirror 14 from the signals output by alignment sensors 46a-46c.

The apparatus 10 includes a plurality of light sources 40a-40c, which are positioned around the perimeter of the primary mirror 12. The light sources 40a-40c may be fixed directly to the primary mirror 12. The light sources 40a-40c are rigidly fixed to the primary mirror 12. Rigidly fixing the light sources 40a-40c to the mirror 12 is advantageous in that this makes it difficult to move the light sources 40a-40c out of their predetermined alignment with respect to the primary mirror 12. This improves the robustness of the apparatus 10 and reduces the number of parts in the apparatus 10 which may become misaligned.

As mentioned above, the light sources 40a-40c may be directly fixed to the primary mirror 12. In an alternative arrangement however the light sources may be fixed to the primary mirror 12 via mountings. In some instances the primary mirror may be held in a mirror mounting, and the light source mountings may be fixed to the mirror mounting, thereby fixing the light sources to the mirror. Where this is done, the mirror mounting and light source mountings are arranged such that the light sources are rigidly fixed relative to the primary mirror.

It is preferred that the light sources 40a-40c are adjacent to the primary mirror 12. Fixing the light sources 40a-40c adjacent to the primary mirror 12 allows the light sources to be rigidly fixed relative to the primary mirror, at a relatively low cost in terms of the weight and complexity of any mounting which is used (compared with what would be the case if the light sources were located some distance away from the primary mirror).

The light sources 40a-40c may be equally spaced around the perimeter of the primary mirror 12. A corresponding alignment sensor 46a-46c is located opposite each respective light source 40a-40c (the alignment sensors may for example be diametrically opposite the light sources).

Each alignment sensor 46a-46c is fixed in a predetermined position and orientation relative to the primary mirror 12. The alignment sensors may be rigidly fixed to the primary mirror. Rigidly fixing the alignment sensors 46a-46c to the primary mirror 12 is advantageous in that it is difficult to move the alignment sensors 46a-46c out of their predetermined position and orientation with respect to the primary mirror 12 and the light sources 40a-40c.

The alignment sensors 46a-46c may be directly fixed to the primary mirror 12. In an alternative arrangement however the alignment sensors may be fixed to the primary mirror 12 via mountings. In some instances the primary mirror may be held in a mirror mounting, and the alignment sensor mountings may be fixed to the mirror mounting, thereby fixing the alignment sensors to the mirror. Where this is done, the mirror mounting and alignment sensor mountings are arranged such that the alignment sensors are rigidly fixed relative to the primary mirror.

It is preferred that the alignment sensors 46a-46c are adjacent to the primary mirror 12. Fixing the alignment sensors adjacent to the primary mirror 12 allows the alignment sensors to be rigidly fixed relative to the primary mirror, at a relatively low cost in terms of the weight and complexity of any mounting which is used (compared with what would be the case if the alignment sensors were located some distance away from the primary mirror).

Rigidly fixing the light sources 40a-40c and alignment sensors 46a-46c to the primary mirror 12 is particularly advantageous in that the light sources 40a-40c and alignment sensors 46a-46c under normal working conditions would not be expected to be out of alignment with the primary mirror 12 or with one another. The problem of misalignment in the apparatus 10 is therefore effectively reduced to the misalignment of the secondary mirror 14 with the primary mirror 12.

Each light source 40a-40c is arranged to provide a respective beam of light 42a-42c directed at the secondary mirror, such that the reflected beams 44a-44c are incident upon the respective alignment sensors 46a-46c. The reflected beams 44a-44c are reflected so as to travel directly from the secondary mirror 14 to the alignment sensors 46a-46c.

Typically, each light source 40a-40c will provide a collimated beam of light e.g. each light source could be a laser such as a laser diode. Typically, each light source 40a-40c is arranged to provide a respective beam 42a-42c directed towards a single point on the secondary mirror 14, such as the optimal centre position of the secondary mirror 14. In practice, it may be the case that the beams are not all incident upon a single point on the secondary mirror. However, it will generally be the case that the beams converge towards one another as they travel towards the secondary mirror 14. Any change in the position and/or tilt of the secondary mirror 14 will be observed as a shift in the position of the reflected beams 44a-44c incident on the alignment sensors 46a-46c.

Figure 4A:
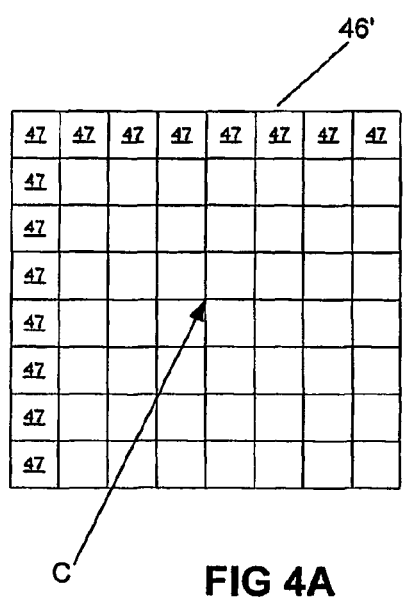
FIGS. 4A & 4B are plan views of two different types of alignment sensor appropriate for use in embodiments of the present invention.
Figure 4B:
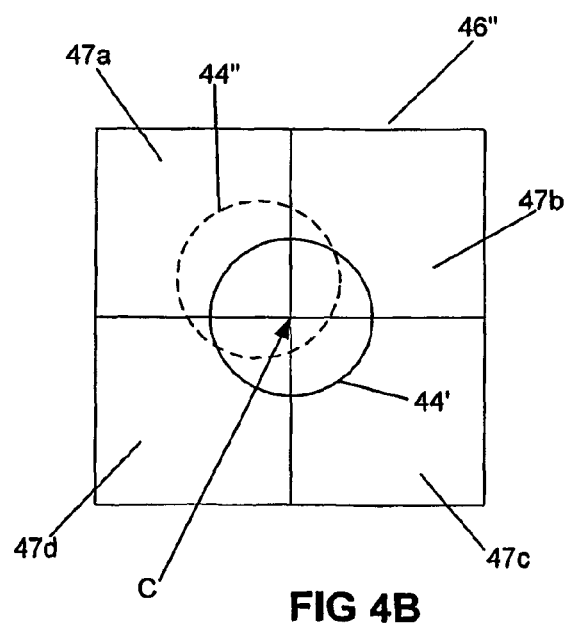

Each alignment sensor 46a-46c typically takes the form of a two-dimensional image sensor such as a CCD or a CMOS sensor. FIGS. 4A and 4B show two different possible implementations of a suitable alignment sensor 46', 46". Each sensor 46', 46" comprises a respective array of sensor elements 47, 47a-47d.

The sensor 46' indicated in FIG. 4A comprises an 8×8 array of sensor elements 47. The relative intensity of the reflected beam detected by each sensor element 47 of the sensor 46' allows the position of the reflected beam incident on the sensor 46' to be accurately determined.

Alternatively, as indicated in FIG. 4B, the alignment sensor 46" can simply be a quadature detector having four sensor elements 47a-47d. If the incident beam is, as indicated by the circle 44', incident on the direct centre C of the detector, then each element will detect an equal intensity of incident light. However, if, as indicated by the dotted circle 44" the incident beam is offset, then different elements will receive different intensities of incident light.

Each alignment sensor 46 can comprise a large array of sensor elements e.g. it could be a 512×512 sensor element array, or an array having even more sensor elements. In general, however many sensor elements a sensor comprises, the position of an incident beam upon the sensor may be determined by analysis of the relative intensities of light which fall upon each of the sensor elements. A small number of sensor elements has the advantage of simple and cost effective construction. However, a larger number of sensor elements is advantageous in that the position of the incident beam of light, and thereby the alignment of the mirrors 12, 14 may be determined more accurately and for a greater possible range of alignments.

Any change in the position and/or tilt of the secondary mirror 14 will be observed as a shift in the position of the reflected beams 44a-44c incident on to the respective detectors 46a-46c. The particular configuration described herein will be particularly sensitive to angular displacements of the secondary mirror 14 with respect to the primary mirror 12 (i.e. to tilt) and slightly less sensitive to the change in separation of the mirrors (i.e. linear focus displacement along axis 20).

The mirrors 12, 14, light sources 40a-40c and alignment sensors 46a-46c may be arranged such that the beams of light directed by the light sources 40a-40c onto the secondary mirror 14 are incident upon a single small area of the secondary mirror 14. This is advantageous in that the secondary mirror may be of any desirable dimensions or surface shape, provided that the small area of the secondary mirror 14 reflects the beams of light 44a-44c towards the alignment sensors 46a-46c. Preferably, the mirrors and light sources and corresponding sensors are aligned such that, when the mirrors are correctly aligned, each reflected beam 44a-44c will be incident in the centre C of each two-dimensional alignment sensor 46a-46c.

The controller 50 is arranged to receive the output signals from the sensors 46a-46c, and then use that information to control the actuators 32 so as to move the secondary mirror 14 to the desired position and/or maintain the secondary mirror 14 in the desired position.

The controller 50 may be pre-calibrated, so as to automatically adjust the actuators 32 by predetermined amounts, based upon the values of the output signals from the sensors 46a-46c. For example, the controller 50 could contain a look-up table, with different control functions/values for signals to control the actuators 30 mapped on to corresponding output signal values of the sensors 46a-46c.

Alternatively, the controller 50 could be utilised to analyse the three sets of coordinates received from the sensors 46a-46c (each coordinate corresponding to a position of the respective beam incident on that sensor), and hence calculate the required actuator translations, necessary to achieve the desired position of the secondary mirror 14 relative to the primary mirror.

Figure 3:
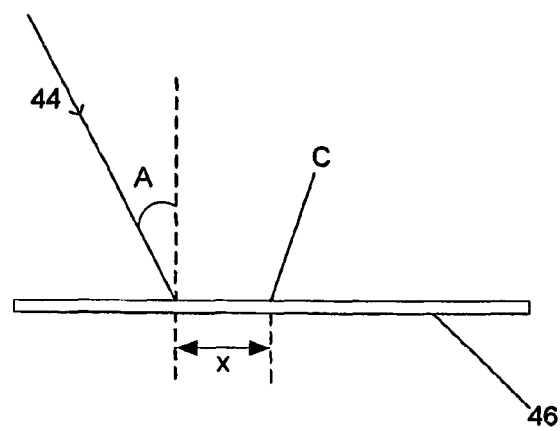
FIG. 3 is a schematic diagram, illustrating a light beam incident on an alignment sensor.

For example, consider an incident reflected beam 44 on a sensor 46, as shown in FIG. 3. The beam 44 is incident upon the sensor at a distance x from the centre C position of the sensor. The beam 44 is incident at an angle A relative to the perpendicular to the plane of the sensors. As the angle A will not alter much due to minor perturbations in the position of the secondary mirror 14, the angle A can be assumed to be fixed for calculation purposes. In particular, the angle A can be fixed as a constant during a calibration procedure. A typical value of the angle A would be about 20°. The distance x the beam is displaced on the sensor can hence, from geometry, be calculated as being approximately x=2d tan A cos A, where d is the displacement along the axis 20 of the secondary mirror 14 from the optimum position. In the above example, for a 1 micron detectable movement on the sensor surface, this will equate to approximately a 1.5 micron axial movement of the secondary mirror 14.

The tilt of the secondary mirror 14 will also result in a corresponding tilt of the reflected beam 44. In particular, if the secondary mirror 14 is tilted by an amount X, then the reflected beam will be tilted by an amount 2X i.e. a 1 micron detectable movement of the beam on the sensor will equate to a tilt of the secondary mirror 14 of approximately 0.5 mrad in the above example. Based upon the particular geometry (positions and orientation) of the light sources and the alignment sensors, and the desired optimum position of the secondary mirror 14 relative to the primary mirror, the controller 50 can hence calculate the desired actuator control signals, so as to control the actuators to move the secondary mirror 14 to the optimum position.

It should be appreciated that the above embodiments are described by way of example only, and that various other configurations will be apparent to the skilled person as falling within the scope of the appended claims.

For example, particular positions and numbers of light sources, alignment sensors and supports are described. The skilled person will appreciate that other numbers and other configurations of such elements could be utilised. For example, any number of supports or light sources could be utilised e.g. a telescope could utilise two supports and/or two light sources. Other configurations of such elements include altering the details of the relevant element being utilised. For example, in the above embodiment the light sources 40a-40c have been described as each typically providing a collimated beam of light. However, it will be appreciated that the light sources could provide uncollimated beams of light e.g. the beams could be converging or diverging. Each light source could be arranged to provide a beam of light that diverges (converges) slightly, such that after reflection from a concave (convex) mirror, the resulting reflected beam is collimated. Alternatively, each light source could be arranged to provide a beam of light such that after reflection from the mirror surface, the resulting reflective light beam focuses to a spot on the corresponding alignment sensor.

Equally, although a particular arrangement using two-dimensional sensors has been described, it should be appreciated that one-dimensional sensors can be utilised. Further, although in the preferred embodiment it is described that each light source is arranged to provide a beam directed at the centre (e.g. the optical centre) of the secondary mirror 14, it should be appreciated that the beams from the light sources could be reflected from other positions on the secondary mirror 14.

Although the light sources 40a-40c and sensors 46a-46c have been described as being fixed to the primary mirror 12, they may be fixed to the secondary mirror 14. In general language, the light sources may be described as being fixed to a first mirror, which may for example be the primary mirror 12 or the secondary mirror 14.

Further, a particular arrangement of the mirrors 12, 14 is described. It will be appreciated by the skilled person that other mirror arrangements can be utilised. For example, a large number of reflective telescopes and catadioptric telescopes are known, and embodiments of the present invention could be implemented in any such telescopes, or indeed in any other appropriate optical apparatus, including two mirrors having a desired predetermined relative position. Each mirror could be any shape (e.g. flat, concave or convex). The present application can be used in any two-mirror system. The two mirrors can form a real image or be afocal, or can be any two components in a larger multi-mirror system. The mirrors need not necessarily be aligned so as to obtain the best possible image quality. The optical apparatus can be arranged to control the actuator to adjust the position of the second mirror to any desired predetermined relationship in relation to the first mirror. For example, the two mirrors can be adjusted with respect to each other to regain the initial alignment state of the two mirrors, as formed in the manufacture of the apparatus containing the two mirrors.

The invention claimed is:

1. An optical apparatus comprising:
   a first mirror;
   a second mirror configured to receive light reflected from the first mirror; and at least one support for holding the second mirror in substantially a predetermined position relative to said first mirror, wherein said at least one support comprises at least one actuator arranged to adjust the position of the second mirror; and said optical apparatus further comprises:

at least one light source rigidly fixed around a periphery of the first mirror in a predetermined orientation for providing a beam of light directed at said second mirror;

at least one corresponding alignment sensor fixed to the first mirror for detecting the beam of light reflected from said second mirror, and arranged to provide an output signal indicative of the position of the incident reflected beam; and a controller arranged to receive said output signal, and to thereby control said actuator to adjust the position of the second mirror.

2. An apparatus as claimed in claim 1, wherein the apparatus is arranged such that, when the first and second mirrors are aligned, the beam of light from the at least one light source is reflected from the second mirror directly onto the corresponding alignment sensor.

3. An apparatus as claimed in claim 1, wherein the at least one alignment sensor is fixed around a periphery of the first mirror.

4. An apparatus as claimed in claim 1, wherein the at least one alignment sensor is fixed in a respective predetermined orientation in said apparatus.

5. An apparatus as claimed in claim 1, the apparatus comprising a plurality of said light sources and a corresponding plurality of alignment sensors, each positioned adjacent to the first mirror.

6. An apparatus as claimed in claim 5, wherein the beams of light provided by the light sources converge towards one another as they travel towards the second mirror.

7. An apparatus as claimed in claim 5, wherein the reflected beams of light diverge away from one another as they travel towards the respective alignment sensors.

8. An apparatus as claimed in claim 5, wherein each light source is positioned diametrically opposite a corresponding alignment sensor.

9. An apparatus as claimed in claim 5, wherein said light sources and said sensors are uniformly spaced around the perimeter of the first mirror.

10. An apparatus as claimed in claim 1, comprising three of said light sources.

11. An apparatus as claimed in claim 1, wherein each of said at least one support extends between the first mirror and the second mirror, and is coupled to both the first mirror and the second mirror.

12. An apparatus as claimed in claim 1, comprising at least three of said supports.

13. An apparatus as claimed in claim 1, wherein said controller is arranged to control said at least one actuator so as to control both the translation and tilt of the second mirror relative to the first mirror.

14. An apparatus as claimed in claim 1, wherein said optical apparatus comprises a telescope.

15. An apparatus as claimed in claim 1, wherein said optical apparatus comprises a telescope.

16. An apparatus as claimed in claim 15, wherein the first mirror is a primary mirror of the telescope, and the second mirror is a secondary mirror of the telescope.

17. A method of manufacturing an optical apparatus, the method comprising:

providing a first mirror;

providing a second mirror configured to receive light reflected from the first mirror; and providing at least one support for holding the second mirror in substantially a predetermined position relative to said first mirror, wherein said at least one support comprises at least one actuator for adjusting the position of the second mirror; and the method further comprises:

providing at least one light source rigidly around a periphery of the first mirror in a predetermined orientation for providing a beam of light directed at said second mirror; and providing at least one alignment sensor fixed to the first mirror for detecting the beam of light reflected from said second mirror, the sensor being arranged to provide an output signal indicative of the position of the incident reflected beam; and providing a controller arranged to receive said output signal, and to thereby control said actuator to adjust the position of the second mirror.

18. A method of operating an optical apparatus, the apparatus comprising a first mirror, a second mirror configured to receive light reflected from the first mirror and at least one support for holding the second mirror in a predetermined position relative to the first mirror, said support comprising at least one actuator for adjusting the position of the second mirror, the method comprising:

providing a beam of light directed at the second mirror from a light source rigidly fixed around a periphery of the first mirror;

detecting the position on a detector of the beam of light reflected from the second mirror, and controlling said actuator to control the position of the second mirror based upon information indicative of the position of the detected beam.

19. A method as claimed in claim 18, further comprising the step of launching the optical apparatus into space.

20. A method as claimed in claim 18, wherein said at least one actuator is controlled to align the position of the second mirror relative to the first mirror.

* * * * *